Patented Aug. 25, 1936

2,051,843

UNITED STATES PATENT OFFICE

2,051,843

METHOD OF PRODUCING A WATERPROOF SCROOP ON FIBER MATERIALS

Ernst Götte, Chemnitz, Germany, assignor to American Hyalsol Corporation, Wilmington, Del., a corporation of Delaware No Drawing. Application May 11, 1934, Serial No. 725,115. In Germany May 15, 1933

13 Claims. (Cl. 8—20)

This invention relates to a process of producing a waterproof scroop on fibers or fibrous material and as well to the resulting products.

Many substances and mixtures of substances have been proposed for the scrooping of artificial silk and other fibers, such for example, glue, gelatin, starch and malt preparations etc., and mixtures of various lower molecular organic acids as lactic and tartaric acids or various salts thereof together with an emulsified mineral or vegetable or animal oil, as olive oil and neat's-foot oil. These compounds or mixtures are not totally satisfactory because of their instability against moisture or washing, their tendency on ageing to become rancid or to discolor the fibrous material, their expense, or the expense of application or their insufficient scrooping effect.

Recently it has also been proposed to use for this purpose sulfuric acid esters of fatty alcohols, either alone or in admixture with a proportion of a free fatty alcohol, but these substances though they are considerably superior to the older scrooping agents do not withstand washing in heated water and are soon removed.

The principal object of the present invention is to provide a class of agents which besides having excellent scrooping qualities also possesses properties which resist the repeated action of water over an extended period of time.

Accordingly, it is now proposed to impregnate fibers with a water-proof scrooping agent composed of the reaction product of an organic compound containing a positively charged hydrophobic group with an organic compound containing a negatively charged hydrophobic group.

Of the organic compounds containing a positively charged hydrophobic group found suitable there may be mentioned in particular, the quaternary ammonium compounds of higher molecular weight, that is, having a molecular weight of at least about 120, or containing at least 8 carbon atoms. These compounds may be of aliphatic, aromatic, aliphatic-aromatic, hydroaromatic or of heterocyclic structure. Of this group, the heterocyclic quaternary ammonium compounds are preferred, particularly because of their accessibility on the market.

Quaternary ammonium bases which if necessary to bring to the desired molecular weight have been substituted with acyl or alkyl radicals are especially suitable for the instant purpose and may satisfactorily be produced from diamines as by acylating ethylene diamine.

Of the organic compounds containing a negatively charged hydrophobic group, the higher molecular alkyl esters of sulfuric acid are preferred. Instead of alkyl sulfates, the higher molecular alkyl esters of other polybasic strong mineral acids such as of phosphoric acid may be employed. Instead of the acid esters, their alkali metal salts may be used with similar beneficial results. Other organic compounds which may be used with varying degrees of success include, higher molecular fatty acids, soaps, red oils, higher molecular acids, for example, citric acid, and the alkali metal salts of these acids or acidified compounds. In the appended claims, all of the foregoing substances are referred to broadly as "higher molecular hydrocarbon acidic compounds."

The higher molecular esters of sulfuric acid, containing at least 8 carbon atoms, include dodecyl sulfuric acid, hexadecyl sulfuric acid, octadecyl sulfuric acid, octadecenyl sulfuric acid and also their alkali metal salts. Furthermore, there also may be employed, ceryl sulfuric acid, the sulfate derivatives of the alcohols derived by reducing processes from castor oil and linseed oil, of the secondary and tertiary aliphatic alcohols with at least 8 carbon atoms and also of hydroaromatic, aromatic and heterocyclic alcohols.

In applying the water-proof scroop to the fibers, the fibers may be treated with a single bath containing both the organic compounds containing the oppositely charged hydrophobic groups, or with separate baths in succession in either order, each bath containing only one of the compounds. The best method of applying the scroop depends, of course, upon the combination of compounds employed and upon the particular fiber material treated. Most satisfactory results are generally obtained by separately fixing the compounds on the fibers whereby the reaction between the compounds occurs on the fibers.

The baths in which the fibers are treated are prepared by dissolving or suspending small percentages of the compounds in water, or other suitable liquid. The fibers are soaked for several minutes preferably at an elevated temperature, until the desired amount of impregnation has occurred. A period of about 10 minutes at a temperature of about from 30° to 50° C. is usually sufficient.

Concerning the amounts of the two organic compounds, stoichiometric proportions have proved advantageous in most cases. However, with certain compounds, even better results are obtained by using an excess of the quaternary ammonium compound. This I consider to be an additional feature of my invention.

Example 1

Solutions of the following ingredients are separately prepared:

Commercial octadecyl pyridinium chloride in a ratio of 2 grams per liter.

Commercial hexadecyl ester of sulfuric acid in a ratio of 1 gram per liter.

Commercial octadecyl ester of sulfuric acid in a ratio of 1 gram per liter.

These solutions are then mixed together and heated to a temperature of 40° C. after which a quantity of rayon is added. After about 10 minutes the rayon is removed and dried without rinsing. An excellent water-proof scroop is obtained capable of resisting many treatments with water at temperatures of 40° C. for periods of 10 minutes.

Example 2

A quantity of viscose silk is treated with a solution of octadecyl pyridinium chloride of a strength of 2 grams per liter, at a temperature of 40° C. for a period of 10 minutes. The silk is then withdrawn, centrifuged and soaked for an additional period of 10 minutes at 40° C. in a solution of the sodium salt of octadecyl sulfuric acid. After removal from the solution, the silk is again centrifuged and finally dried. A very good water-proof scroop is obtained.

Example 3

A quantity of viscose silk material is impregnated at a temperature of 35° C. for a period of 10 minutes with a solution of hexadecyl pyridinium bromide of a 2 grams per liter strength. The withdrawn silk is centrifuged and then treated with a solution of the sodium salt of tetradecyl sulfate in a ratio of 2 grams per liter, for an additional period of 10 minutes at 35° C. Centrifuging and drying the withdrawn silk produces an excellent water-proof scroop capable of resisting many washings or wet treatments.

Instead of the sulfuric acid esters of the higher molecular aliphatic alcohols, there may be used with somewhat less efficiency the true sulfonic acid derivatives of the same compounds or their salts.

The salts of the esters and sulfonic acids which are satisfactory, include besides the alkali metal salts, also the alkaline earth and ammonia salts.

The higher molecular alkyl ester of phosphoric acid hereinbefore described may be either the orthophosphoric acid derivative or the pyrophosphoric acid derivative or the salts of either of these derivatives with the metals above described.

Other quaternary ammonia salts suitable for the present process are octadecyl pyridinium sulphate, hexadecyl pyridinium sulphate, decyl chinolinium sulphate, the quaternary ammonia salt derived from oleyl- diethyl-ethylenediamine (Sapamin) by addition of dimethyl sulphate, triethyl-cetyl ammonium iodide.

It should be understood that the invention is not limited to the specific examples given either as to the compounds described or the methods disclosed of applying the compounds to the fibrous materials, but that the invention covers all compounds and methods of application and equivalents coming within the scope of the broad description of the invention and as specified in the appended claims.

In a related application filed by the present applicant and Walter Kling, Serial No. 733,332, filed June 30, 1934, entitled "Pigmenting fibrous materials" treatments are effected which employ compounds containing positively charged hydrophobic groups and compounds possessing negatively charged hydrophobic groups.

In the claims, where a higher molecular alkyl ester of a polybasic acid is specified, it should be understood that the hereindisclosed salts of these compounds are also included.

I claim:

1. The process of producing a water-proof scroop on fibrous materials comprising applying to a fibrous material, a reaction product of an organic compound containing a positively charged hydrophobic group and an organic compound containing a negatively charged hydrophobic group and at least one alkyl radical of at least eight carbon atoms.

2. The process as described in claim 1, wherein the organic compounds are reacted after application to the fibrous material.

3. The process as described in claim 1 wherein solutions of the organic compounds are applied to the fibrous material in succession.

4. The process of producing a water-proof scroop on fibrous materials comprising applying to a fibrous material a reaction product of a higher molecular quaternary ammonium compound possessing a positively charged hydrophobic group and a higher molecular aliphatic hydrocarbon acidic compound possessing a negatively charged hydrophobic group.

5. The process of producing a water-proof scroop upon rayon comprising applying to said fibers a reaction product of a higher molecular quarternary ammonium base and a higher molecular alkyl ester of a polybasic strong inorganic acid.

6. The process of producing a water-proof scroop upon rayon comprising applying to said fibers a reaction product of a higher molecular quaternary ammonium base of a higher molecular alkylated quaternary pyridinium halide and a higher molecular alkyl ester of sulfuric acid.

7. The process as described in claim 4 wherein the quantity of the quaternary ammonium compound employed is in excess of the stoichiometric proportions.

8. A fibrous material impregnated with a reaction product of an organic compound containing a positively charged hydrophobic group and an organic compound containing a negatively charged hydrophobic group and at least one alkyl radical of at least eight carbon atoms.

9. A textile material impregnated with an organic scrooping agent containing a positively charged hydrophobic group and an organic scrooping agent containing a negatively charged hydrophobic group.

10. The process of producing a water-proof scroop upon textile materials consisting of applying to a textile material a higher molecular quaternary ammonium compound possessing a positively charged hydrophobic group and a higher molecular hydrocarbon acidic compound possessing a negatively charged hydrophobic group.

11. The process of producing a water-proof scroop comprising applying to a textile material a higher molecular quaternary ammonium base containing a higher molecular alkyl radical and a negative component of a strong mineral acid, and also applying a higher molecular hydrocarbon acidic compound.

12. A fibrous material impregnated with a reaction product of a higher molecular pyridinium derivative of the quaternary ammonium type possessing a positively charged hydrophobic group with an acid compound possessing a negatively charged hydrophobic group selected from the group of substances consisting of the higher molecular alkyl derivatives of sulfuric, sulfonic, phosphoric and pyrophosphoric acids, and their respective alkali metal salts.

13. The process of producing a water-proof scroop on fibrous materials comprising applying to a fibrous material a reaction product of a higher molecular quaternary ammonium compound possessing a positively charged hydrophobic group and an alkali metal salt of an acid containing a higher molecular aliphatic hydrocarbon radical possessing a negatively charged hydrophobic group.

ERNST GÖTTE.